United States Patent
Prasad

(10) Patent No.: US 11,032,095 B2
(45) Date of Patent: Jun. 8, 2021

(54) METHOD FOR OPTIMIZED DELIVERY OF SUB-SERVICE FLOWS USING BROADCAST/MULTICAST

(71) Applicant: Nokia Technologies Oy, Espoo (FI)

(72) Inventor: Athul Prasad, Helsinki (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/463,336

(22) PCT Filed: Nov. 23, 2016

(86) PCT No.: PCT/US2016/063514
§ 371 (c)(1),
(2) Date: May 22, 2019

(87) PCT Pub. No.: WO2018/097827
PCT Pub. Date: May 31, 2018

(65) Prior Publication Data
US 2019/0379551 A1  Dec. 12, 2019

(51) Int. Cl.
*H04L 12/18* (2006.01)
*H04L 29/08* (2006.01)
(Continued)

(52) U.S. Cl.
CPC ........ *H04L 12/189* (2013.01); *H04L 67/2842* (2013.01); *H04W 4/06* (2013.01); *H04W 72/005* (2013.01)

(58) Field of Classification Search
None
See application file for complete search history.

(56) References Cited

U.S. PATENT DOCUMENTS 7,707,246 B1* 4/2010 Issa ............... G06Q 10/10
709/204
8,989,021 B2  3/2015 Simon
(Continued)

FOREIGN PATENT DOCUMENTS

WO  WO-2013181191 A1  12/2013

OTHER PUBLICATIONS

Lecompte, David, and Frédéric Gabin, "Evolved multimedia broadcast/multicast service (eMBMS) in LTE-advanced: overview and Rel-11 enhancements." IEEE Communications Magazine 50.11 (2012): 68-74.

(Continued)

*Primary Examiner* — Chi H Pham
*Assistant Examiner* — Vladislav Y Agureyev
(74) *Attorney, Agent, or Firm* — Mintz Levin Cohn Ferris Glovsky and Popeo, P.C.

(57) ABSTRACT

Methods and apparatus, including computer program products, are provided for selecting transmitting common content to user equipment via a multicast, broadcast. In one aspect there is provided a method. The method may include detecting whether content is common content to be provided, via a multicast, broadcast transmission, to at least one user equipment; forwarding the common content to a multicast, broadcast gateway to enable delivery to the at least one user equipment via the multicast, broadcast transmission; and forwarding, as a unicast service flow, other content to the at least one user equipment to enable the at least one user equipment to selectively combine the unicast service flow with the common content carried by the multicast, broadcast transmission. Related apparatus, systems, methods, and articles are also described.

19 Claims, 5 Drawing Sheets

(51) Int. Cl.
*H04W 4/06* (2009.01)
*H04W 72/00* (2009.01)

(56) References Cited

U.S. PATENT DOCUMENTS

| | | | |
|---|---|---|---|
| 9,300,708 B2 | 3/2016 | Dorenbosch et al. | |
| 2007/0244982 A1 | 10/2007 | Scott, III et al. | |
| 2008/0211969 A1* | 9/2008 | Simon | H04H 20/18 |
| | | | 348/725 |
| 2010/0010900 A1 | 1/2010 | Lee et al. | |
| 2010/0299702 A1 | 11/2010 | Lo et al. | |
| 2012/0195247 A1 | 8/2012 | Huang | |
| 2013/0276017 A1 | 10/2013 | Walker et al. | |
| 2013/0279394 A1* | 10/2013 | Aramoto | H04L 12/189 |
| | | | 370/312 |
| 2014/0194100 A1 | 7/2014 | Anchan | |
| 2014/0307734 A1* | 10/2014 | Luby | H04L 65/608 |
| | | | 370/390 |
| 2014/0355508 A1 | 12/2014 | Anchan et al. | |
| 2015/0095955 A1 | 4/2015 | Singh et al. | |
| 2015/0208209 A1 | 7/2015 | Jamadagni et al. | |
| 2015/0334152 A1* | 11/2015 | Oyman | H04W 48/20 |
| | | | 709/219 |
| 2016/0099985 A1* | 4/2016 | Koskinen | H04L 12/18 |
| | | | 370/260 |
| 2017/0064602 A1* | 3/2017 | Kotecha | H04L 12/189 |
| 2017/0078371 A1* | 3/2017 | Kodaypak | H04L 12/189 |
| 2017/0302465 A1* | 10/2017 | Wang | H04W 76/20 |
| 2017/0311290 A1* | 10/2017 | Adjakple | H04W 36/00 |
| 2018/0103364 A1* | 4/2018 | Gholmieh | H04W 40/246 |
| 2019/0075494 A1* | 3/2019 | Mackenzie | H04W 28/0231 |
| 2019/0104389 A1* | 4/2019 | Al-Daher | H04W 4/06 |
| 2019/0223018 A1* | 7/2019 | Norrman | H04W 12/00518 |
| 2019/0273769 A1* | 9/2019 | Lahore-Carrate | |
| | | | H04L 12/1881 |
| 2019/0274011 A1* | 9/2019 | Yoshizawa | H04L 12/189 |

OTHER PUBLICATIONS

Lohmar, Thorsten, et al., "Delivering content with LTE broadcast." Ericsson Review 1.11, Feb. 11, 2013: 2-8.

Prasad, Athul, et al., "Enabling group communication for public safety in LTE-Advanced networks." Journal of Network and Computer Applications 62 (2016): (32 pages).

Protalinski, Emil. "Streaming Services Now Account for over 70% of Peak Traffic in North America, Netflix Dominates with 37%." VentureBeat, VentureBeat, Dec. 7, 2015, (10 pages), venturebeat.com/2015/12/07/streaming-services-now-account-for-over-70-of-peak-traffic-in-north-america-netflix-dominates-with-37/.

Yuan, Chun, Yu Chen, and Zheng Zhang, "Evaluation of edge caching/off loading for dynamic content delivery." IEEE Transactions on Knowledge and Data Engineering 16.11 (2004): (11 pages).

* cited by examiner

METHOD FOR OPTIMIZED DELIVERY OF SUB-SERVICE FLOWS USING BROADCAST/MULTICAST

CROSS-REFERENCE TO RELATED APPLICATIONS

This application is a national stage filing of International Application No. PCT/US16/63514, filed Nov. 23, 2016, entitled "Delivery of Sub-Service Flows Using Broadcast, Multicast," the contents of which are herein incorporated by reference in their entirety.

FIELD

The subject matter described herein relates to wireless.

BACKGROUND

In the Third Generation Partnership Project (3GPP), Multimedia Broadcast Multicast Service (MBMS) can be used to provide content via a service that broadcasts and multicasts the content via cellular. The broadcast, multicast transmission may be provided over one or more cells to one or more user equipment (UE). For example, the cellular network may provide mobile television content to a user equipment using for example a multicast, broadcast single-frequency network (MBSFN) in which base stations transmit on the same frequency in a coordinated way to provide the television content as MBMS.

SUMMARY

Methods and apparatus, including computer program products, are provided for delivering content wirelessly.

In some example embodiments, there is provided a method. The method may include detecting whether content is common content to be provided, via a multicast, broadcast transmission, to at least one user equipment; forwarding the common content to a multicast, broadcast gateway to enable delivery to the at least one user equipment via the multicast, broadcast transmission; and forwarding, as a unicast service flow, other content to the at least one user equipment to enable the at least one user equipment to selectively combine the unicast service flow with the common content carried by the multicast, broadcast transmission.

In some variations, one or more of the features disclosed herein including the following features can optionally be included in any feasible combination. The multicast, broadcast may comprise a multicast transmission and/or a broadcast transmission. The common content may be cached at an edge caching server in a mobile wireless network. The common content forwarded to the multicast, broadcast gateway may further include information regarding one or more cells to which to transmit the common content via the multicast, broadcast. The forwarded common content may be handled as a sub-service flow to the at least one user equipment and delivered through a dynamic network slice. The common content may include content common to a plurality of user equipment within an area covered by the multicast, broadcast transmission. The common content may include content frequency downloaded by a plurality of user equipment within an area covered by the multicast, broadcast transmission. The detection of whether content is common content may be based on an indication representative of common content and/or an inspection of one or more packets. The indication may be applied by a content provider to indicate that the content is common content. The content provider may indicate that the content is common content. The detection of whether content is common content may be based how frequently content is fetched to a plurality of user equipment in an area.

In some example embodiments, there is provided a method. The method may include receiving, via a unicast transmission, content received from a content provider via a serving gateway; receiving an indication regarding common content to be received from via a multicast, broadcast transmission; and combining the content received via the unicast transmission and the common content received via the multicast, broadcast transmission.

In some variations, one or more of the features disclosed herein including the following features can optionally be included in any feasible combination. The indication may be provided as signaling from a base station and/or provided via an application at the apparatus. The indication may enable the apparatus to switch between a service flow carrying, via the unicast transmission, the content and a sub-service flow carrying, via the multicast, broadcast transmission, and the common content. The multicast, broadcast transmission may include a multicast transmission and/or a broadcast transmission. The common content may be received via the multicast, broadcast transmission, from at least one base station, a multicast, broadcast gateway, and an edge caching server in a mobile wireless network. The common content may include content common to a plurality of user equipment within an area covered by the multicast, broadcast transmission.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
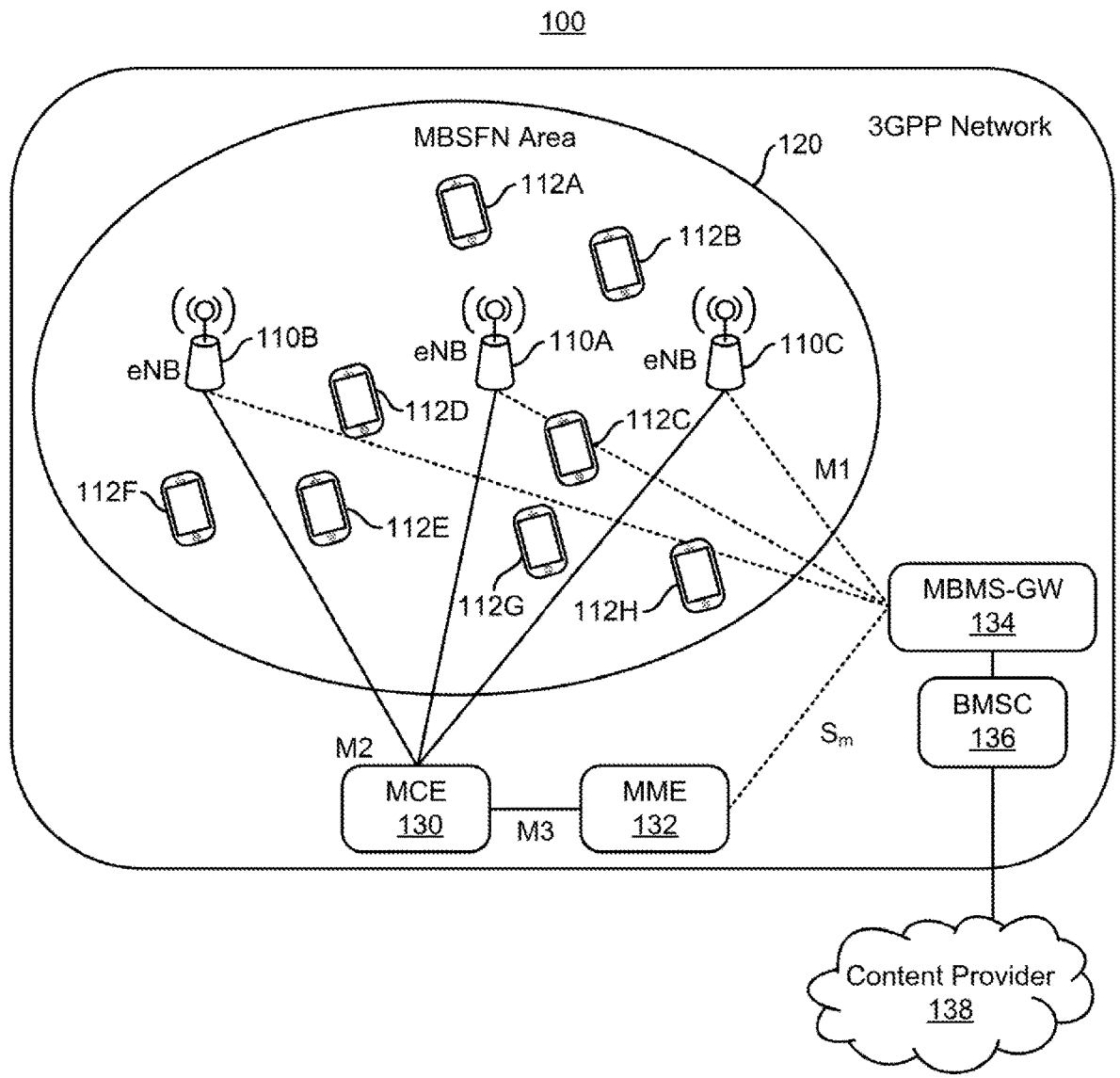
FIG. 1 depicts an example system, in accordance with some example embodiments.

Like labels are used to refer to same or similar items in the drawings.

DETAILED DESCRIPTION

MBMS including multicast, broadcast configured networks have been an aspect in Third Generation (3G), Fourth Generation (4G), and Long Term Evolution (LTE)-Advanced wireless networks. However, until now, the content has mainly been television broadcast content and public safety content (e.g., public warning systems and mission critical communication systems).

Due to increased content quality requirements and time criticality, the amount of radio resources consumed for delivering some content has been increasing steadily over time. The quality requirements (which have been applied to content) have, as noted, increased, while advanced video and audio codecs have also enhanced the quality of experience provided to UEs (and the corresponding end users). The network operator may be driven to allocate higher amounts of radio resources to efficiently and effectively deliver content to the UE (or end user associated with the UE). In the case of public safety related content including services, time criticality may also be a concern with respect to delivering content to UEs including a UE group(s). For example, a group of fire safety personnel may need high quality video content delivery even while indoors, and this content may be delivered in a timely manner via a multicast, broadcast to the group of UEs.

FIG. 1 depicts an example of a system 100 for MBMS service delivery, in accordance with some example embodiments. The system 100 may include one or more base stations 110A-C, such as evolved node B (eNB) type base stations, one or more user equipment 112A-H, a multi-cell/multicast coordination entity (MCE) 130, a mobility management entity (MME) 132, a MBMS gateway 134, and a broadcast, multicast switching center (BMSC) 136.

The user equipment 112A-H may be configured for multicast, broadcast single frequency network (MBSFN) operation while in the MBSFN coverage area 120, which may enable one or more UEs 112A-H within that area to receive MBMS content from the MBMS gateway 134 and the content provider 138. In the case of public safety content, the content provider 138 may represent a server, such as a group communication system enabler (GCSE) and/or other type of server (see, e.g., "Enabling Group Communication for Public Safety in LTE-Advanced Networks," A. Prasad et al., Elsevier—Journal of Computer and Network Applications, vol. 62, Page 41-52, February 2016, which is incorporated by reference in its entirety).

Edge caching technology may include approaches in which the content providers collaborate with the cellular network operators to move content sources from for example the cloud to nodes closer to the radio access network including base stations. In the case of edge caching, commonly used content may be cached in a server at the edge of the mobile, cellular network. From the content provider's perspective, edge caching may be considered efficient as edge caching can reduce the content provider's server load. From the cellular network provider's perspective, edge caching may increase signaling in the cellular network and/or may not scale well due to the need for special interfaces to the content provider's edge caching servers. Due to these factors, cellular network providers may prefer relatively, generic content caching (which can be used frequently among a variety of users) at the edge of the core cellular network, rather than more unique or less commonly used content. In terms of radio resource efficiency, MBMS transmission may be considered more efficient when there are multiple UEs in the network receiving the same content (given proper selection of transmission parameters), when compared to unicast transmissions to each UE.

Given the wide variety of content providers currently available and the anticipated growth in the future, the interactions between the cellular network operators and content providers can be implemented to provide efficient signaling while enabling the native efficiencies provided in MBMS. Another issue with respect to content delivery may relate to resource efficiency. Some, if not a major portion, of peak traffic can be attributed to so-called streaming services, such as music, television, movie, and video streaming services. And, due to the wide variety of content that users can watch at any given time, mobile network operators may deliver the content via services using unicast service flows. But unicast service flows may consume, as noted, greater amounts of valuable radio resources, when compared to MBMS.

In some example embodiments, there may be provided content delivered to one or more user equipment (and thus the corresponding one or more end users) via edge caching and multicast, broadcast techniques. From the network operator perspective, the content delivered via edge caching and multicast, broadcast techniques may be delivered with reduced signaling impacts, interactions, and/or interface requirements, when compared to unicast approaches.

In some example embodiments, a portion of the streaming content deemed to be common (also referred to herein as "common content") to a plurality of UEs (and, e.g., transmitted by a common base station(s) or into common target cell(s)) may be treated as common content for multicast, broadcast session setup and transmission. For example, the common content may include an advertisement video stream, which may be common to a plurality of UEs in a target cell(s).

In some example embodiments, a portion of the streaming content deemed to be common (also referred to herein as "common content") to a plurality of UEs (which may be transmitted by at least one common base station(s) and/or into at least one common target cell(s)), may be delivered through a dynamic setup of a network slice for multicast, broadcast content delivery. A dynamic network slice may enable the network operator to dynamically design, deploy, customize, and optimize the physical network infrastructure to deliver various service flows in the most optimized manner. For example, a network node such as a packet gateway (and/or any other network node configured to create a network slice) after detecting the common content delivery and determining the mode of transmission (e.g., unicast, multicast, and/or broadcast) may create a new network slice for delivering the common content, in a radio resource efficient manner. The creation of the slice and delivery of common content through the slice may be signaled to the UE either explicitly by a core node(s) (e.g., through non-access stratum signaling) or radio access network node(s) (e.g., through system information broadcast signaling), although the UE may be informed in other ways as well including implicitly by the UE application layer.

To illustrate further, a group of UEs may each be streaming different television or movie content via separate unicasts, but the advertisements may represent common content for the group of UEs. For example, the UEs may receive their different television/movie streaming content via separate unicast service flows, but the UEs may receive, via multicast, broadcast transmission, the advertisement video stream as common content provided from an edged cached server, in accordance with some example embodiments. The multicast, broadcast transmission of the advertisement may be a sub-service flow to the UEs.

Although the previous example refers to advertisement content being handled as common content for edge caching and multicast, broadcast transmission, other types of content may also be handled including a popular video clip that is being frequently fetched or downloaded during a particular timeframe, a periodic advertisement, broadcast information such as feature updates meant for massive, machine type communication devices, a portion of a given popular TV show at a particular time instance, emergency content, warning information to be shown before some video content, a live video event, and/or the like. In some example embodiments, when the network detects that common content is being delivered to multiple users within a given base station(s) or target cell(s), the network may determine that there is an opportunity to establish a new sub-service flow to deliver the common content using multicast, broadcast transmission, rather than unicast service flows.

In some example embodiments, common content may be determined in a variety of ways including deep packet inspection (DPI), marking content as common content, and/or the like. For example, common content may be determined by a node, such as a content provider server, a wireless network node, and/or any other node.

In some example embodiments, common content may be determined based on how frequently, over a given time period such as hourly, daily, and/or the like, content is fetched from (or expected to be fetched from) an edge catching server. In this way, the edge catching server may include content more likely to be accessed and, as such, more likely to be common content that can be handled from the edge caching server via multicast, broadcast to a group of UEs. For example, a popular video clip that is commonly being fetched during a particular day can be placed in the edge caching server, so that this video clip content can be stored for fast and efficient delivery as common content via multicast, broadcast to a group of UEs.

In some example embodiments, the network operator may perform deep packet inspection (DPI) to detect the common content and then inform the MBMS gateway 134 about which cells (or base stations serving the cells) common content needs to be delivered to via a multicast, broadcast. The cells (or base stations) may be identified based on for example cell identifiers.

In some example embodiments, the content provider may provide a marking such as an indicator (e.g., a certain packet marking) to indicate that the content being streamed to the UEs is common content and/or at least partially common content, such as in the case of the advertisement example noted above.

To illustrate further, a network node, such as the content provider's server and/or other node, may detect that it is likely that certain content is, at a given instance in time, common to a group of UEs being served by a certain base station. When this is the case, the node may mark the common content (e.g., one or more packets associated with the common content) with an indication such as a special packet marking to indicate that the content is common content (or, e.g., at least partially common content) to a group of UEs being served by a given base station(s). The indicator may thus allow the base station or other type of node to handle via a multicast, broadcast transmission the common content (which can be partially common content as noted).

In some example embodiments, deep packet inspection (DPI) of the content may be performed (e.g., by the network or a mobile network operation) to establish that content being delivered is common content for some, if not all, UEs, such as a group of UEs. DPI (also referred to as complete packet inspection and/or inspection extraction) may inspect the data part of the packet(s) (including the header information) passing through a node of the network. The inspection may check for optimizations (or other operations such as filtering, prioritization, de-prioritization, and/or even pack dropping) that could be done based on the content type information.

In some example embodiments, the network operator may perform DPI to detect the common content and then inform a MBMS gateway (GW) about which cell(s) (or base station(s) serving the cell(s)) the common content needs to be delivered to via multicast, broadcast. The target cells (or base stations) may be identified based on for example cell identifiers.

To detect whether the content within the streaming content is common content and thus what transmission mode to use, a node such as packet gateway may use one or more criteria, such as whether there are multiple users in same cell(s) where the content could be more efficiently transmitted. For example, if an emergency warning audio or video stream is to be sent to all of the UEs 112A-H in MBSFN area 120, this content may be handled as common content which can be broadcast to all of the UEs 112A-H. To illustrate further, if a streaming video is frequently being downloaded on a certain day to a group of UEs in a coverage area, the packet gateway may determine that this steaming video is a candidate for common content and, as such, multicast to the group of UEs such as UEs 112A-C.

Alternatively or additionally, the decision to transmit the data using multicast, broadcast could depend on the radio conditions of these multiple users receiving the common content. For example, the network may monitor the reference signal received power (or other type of metric such as a quality level) experienced by the UE(s) to determine whether multicast, broadcast as compared to unicast could be more radio resource efficient to deliver the content.

Alternatively or additionally, the transmission mode selection criteria may include determining whether multicast, broadcast transmission would provide improved resource efficiency as compared to unicast. For example, if there are significant amount of users with poor radio conditions, then using multicast, broadcast might not provide significant resource efficiency as compared to unicast, where a more robust modulation and coding scheme could be used to ensure reliable data delivery. Moreover, if there are only a very limited number of users receiving the data, then the cost of setting up the multicast, broadcast data transmission setup and related delays involved could be significantly higher than delivering the data over unicast.

Alternatively or additionally, the transmission mode selection criteria may include determining whether optimization by placing certain common content on a multicast, broadcast would provide an improvement in terms of reducing user-plane backhaul link load/traffic (since the interfaces need not carry duplicated packets of the same information). For example, the unicast data transmission to multiple users could require related packet duplication to be done over the backhaul link, which could be avoided for multicast, broadcast, where only one copy of the packet needs to be sent through the backhaul links.

Alternatively or additionally, the transmission mode selection criteria may include security related issues. For example, the unicast data transmissions may have over-the-air encryption, whereas the multicast, broadcast mode of transmission may require application level encryption, in order to avoid possible misuse of the data.

Alternatively or additionally, the transmission mode selection criteria may include determining whether the application layer can support receiving sub-flows within the same application through multiple streams, transmission techniques. For example, depending on whether the transmission mode is unicast or multicast, broadcast, the UE's application may be configured to receive multiple streams of the same data, where parts of the data may be received using multicast, broadcast, whereas other parts are received using unicast. The UE's application layer may be configured to support combining these streams into a unified stream for the end user, in order to view the common and dedicated content seamlessly.

As the common content (e.g., advertisement video and/or other types of common content) may have different QoS requirements when compared to a dedicated, streaming content being viewed via a unicast at the UE, the QoS requirement information for the common content may be passed by the content provider to the network operator, in accordance with some example embodiments.

Figure 2:
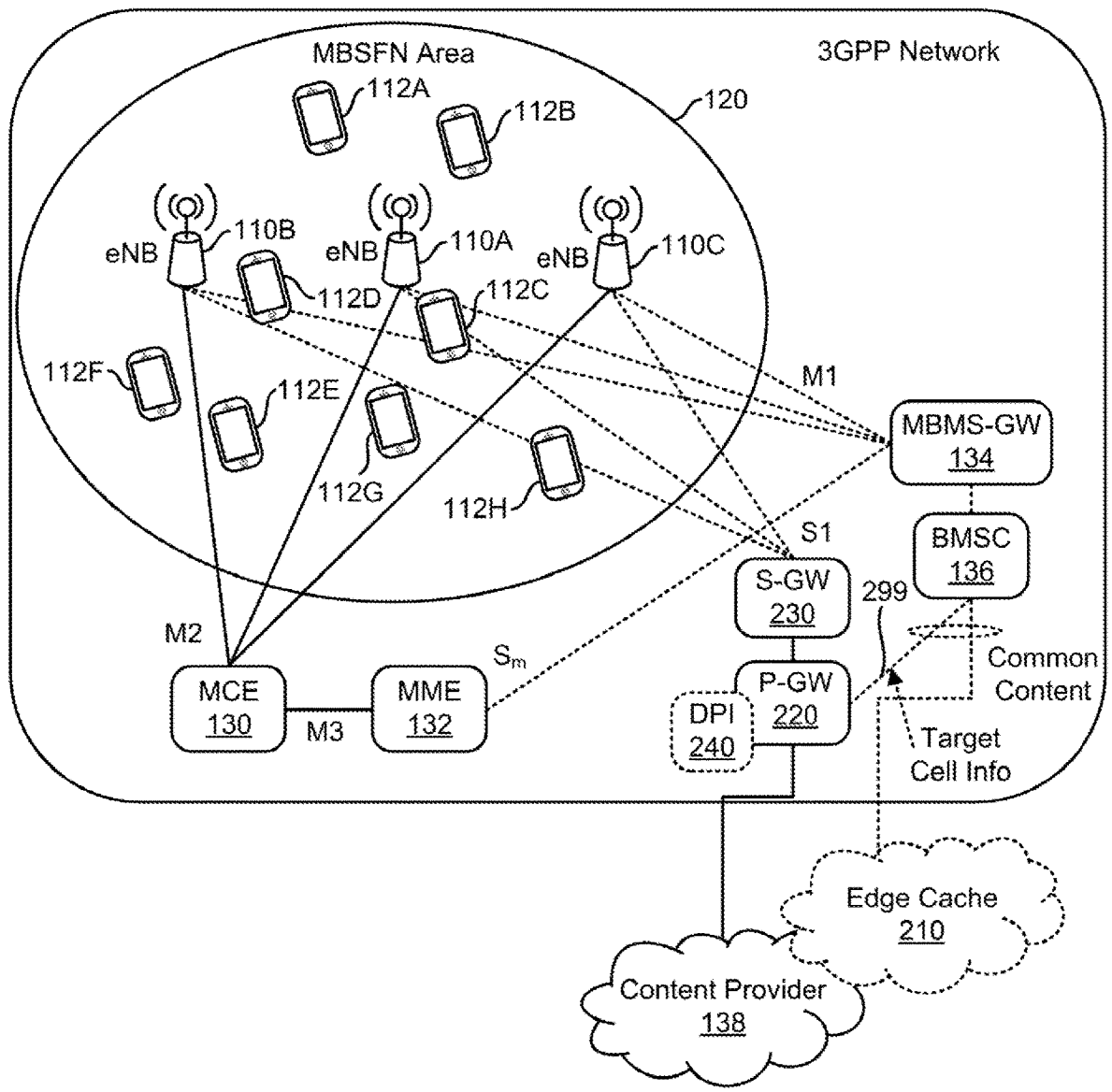
FIG. 2 depicts another example of a system including an edge cache server, in accordance with some example embodiments.

FIG. 2 depicts an example of a system 200 for MBMS service delivery, in accordance with some example embodiments. System 200 is similar to system 100 in some respects but depicts additional edge caching aspects, in accordance with some example embodiments. The MBMS may perform a multicast, broadcast transmission which refers to a multicast transmission to some of the UEs in the MBSFN area 120, while the broadcast refers to a transmission to all of the UEs in the MBSFN area 120. Thus, as used herein, the phrase "multicast, broadcast" transmission refers to a multicast transmission and/or a broadcast transmission.

The content provider and network provider may cooperate and provide the actual content through core network interfaces including unicast service flows, while cached content may be provided through MBMS related interfaces as a sub-service flow. The MBMS related interfaces may interact with unicast gateways, such as a serving gateway (S-GW) 230 and a packet data network gateway 220 (PDN-GW and/or P-GW), to determine which base station(s) 110A-C and/or the like should participate in the final delivery of common content. The participation may be accomplished based on information related to which UEs 112A-H the common content is being targeted to. The UE (and/or application therein) may coordinate by combining (1) unicast, dedicated content originating from the packet data network gateways 230/220 and (2) the common content originating from MBMS gateway 134. In the case of a multicast, broadcast, the UE (and/or application therein) may identify, based on the group information, whether the common content being delivered is meant for the UE.

System 200 may include at least one edge caching server 210, the packet data network gateway 220 (labeled P-GW), and the serving gateway 230 (labeled S-GW). The packet data network gateway 220 may forward unicast service flows to the UEs 112A-F. The unicast service flows may include content from content provider server(s) 138. While common content to one or more UEs 112A-H may be provided as a multicast, broadcast via broadcast, multicast switching center (BMSC) 136 and MBMS-GW 134.

In some example embodiments, a UE and/or application therein may combine the unicast service flow and the sub-service flow associated with the multicast, broadcast. For example, the UEs 112C-D may each be receiving different content streams via separate unicasts, and may both be receiving common content via a sub-service flow associated with the multicast, broadcast. Moreover, the UE (and/or application therein) may combine the unicast service flow with the common content sub-service flow associated with the multicast, broadcast. To combine the unicast service flow with the common content sub-service flow in this example, the UE may receive information related to the multicast, broadcast transmission of data through monitoring of a system information broadcast sent by the base station. Based on the group ID information in the multicast, broadcast transmission and information received from the application layer, the UE may determine whether the multicast, broadcast information being sent is actually meant for the UE (or some other device). The decision to combine the data from the multiple service flows may be taken by the UE application layer by decoding the data received through unicast and through multicast, broadcast. The UE may switch between the different transmission modes, and this switching may be based on the instructions received from the application layer and/or based on determining the most optimal service flow to receive the data.

In some example embodiments, a node, such as a packet gateway (P-GW) 220, may perform DPI 240 to detect whether the common content delivery within the streaming content has started, although the common content may be detected in other ways including via an indicator as noted. For example, the packet gateway may monitor the service flows towards all the UEs and based on DPI detect when the common content delivery is initiated, and initiate multicast, broadcast sessions to deliver these packets to the end users. The packet gateway 220 may detect whether the stream from content provider 138 includes the common content that can be delivered via multicast, broadcast. Packet gateway 220 may also notify other nodes, such as the MBMS gateway 134, regarding the identity of the target base stations and/or cells where the multicast, broadcast transmissions need to be provided.

Figure 3:
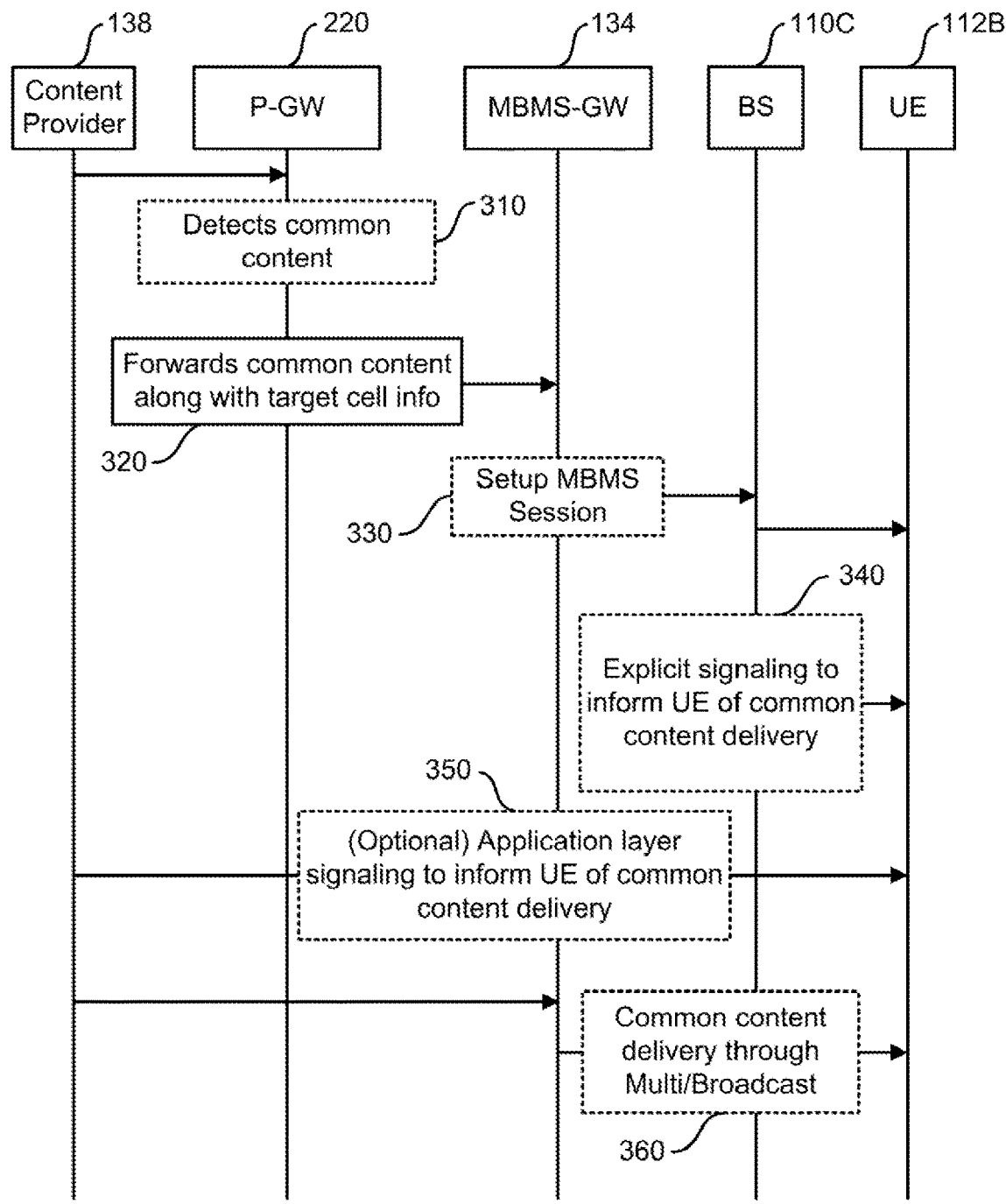
FIG. 3 depicts a signaling diagram for common content delivery, in accordance with some example embodiments.

FIG. 3 depicts an example of a signaling diagram for common content delivery, in accordance with some example embodiments.

At 310, the packet gateway 220 may detect common content, in accordance with some example embodiments. For example, the packet gateway 220 may detect, as noted, that a flow of content from the content provider 138 might include common content. The packet gateway 220 may perform DPI and/or the like to determine that the flow includes common content. Alternatively or additionally, the common content may be marked or include an indication to signal that the content is common content. Further, packet gateway 220 may also determine the target cell(s), or the base station(s) serving those cell(s), by inspecting the packet header information, to determine the target end point of the packet, where it needs to be delivered. This could be determined by inspecting the target IP address of the packet as well. Although the previous example refers to the packet gateway 220 performing the detection of common content and/or determining the target cell(s), other nodes may perform the detection as well.

At 320, the packet gateway 220 may forward detected common content to the MBMS gateway 134 for transmission as a multicast, broadcast, in accordance with some example embodiments. The packet gateway may also forward to the MBMS gateway 134 the target cell(s), such as the base station(s) to which the common content should be provided to as a multicast, broadcast.

At 330, MBMS gateway 134 may setup a MBMS session with at least one target base station such as base station 110C covering at least one UE such as UEs 112A-B, in accordance with some example embodiments. For example, the MBMS gateway 134 may setup an MBMS session by establishing and scheduling bearers at target base stations 110C (although the MBMS gateway may set up MBMS with the other base stations 110A and/or B as well). In the case of MBSFN, the MBSFN bearers may be established and scheduled to enable carrying the common content during an MBMS session to at least one UE in the coverage area, such as the MBSFN coverage 120 of the target base station 110C.

At 340, the target base stations 110C may signal the at least one UE 112B so that the at least one UE 112B is informed of the common content delivery, in accordance with some example embodiments. This signaling may inform the UE(s), so that the UE can combine the unicast service flow from the serving/packet gateway 220/230 with the edge caching content being carried via the MBSFN by the multicast, broadcast sub-service flow.

Alternatively or additionally, the at least one UE 112B may, at 350, be informed of the common content delivery via application layer signaling between the content provider 138 and the at least one UE 112B (or an application therein), in accordance with some example embodiments. When this is the case, the application provides information to allow the UE to combine the unicast service flow with multicast, broadcast sub-service flow (carried via the MBSFN). For example, the application may provide information indicating that common content is, or will be received via a multicast, broadcast, and this information may include additional information including a schedule or when the multicast, broadcast will take place, an identifier of the multicast, broadcast session, and/or other information to allow the UE and/or application therein to identify the multicast, broadcast session. At 360, the at least one base station 110C may deliver the common content via multicast, broadcast sub-service flow to the at least one UE 112B, in accordance with some example embodiments.

In some example embodiments, the network may explicitly inform, as noted above, the UE that the common content is going to be, or is being, delivered through a multicast, broadcast. In some example embodiments, an application may inform the UE through application layer signaling (between the application server/content provider and the application client at the UE) that the common content is going to be delivered through multicast, broadcast.

The content provider 138 may cache the common content at the edge cache server(s) 210. This caching may occur from time to time and/or periodically. The cached, common content may then be sent to the UE through a multicast, broadcast, rather than a unicast path. The use of the multicast, broadcast may reduce the use of radio and/or network resources, when compared to separate unicast paths to each UE.

Figure 4:
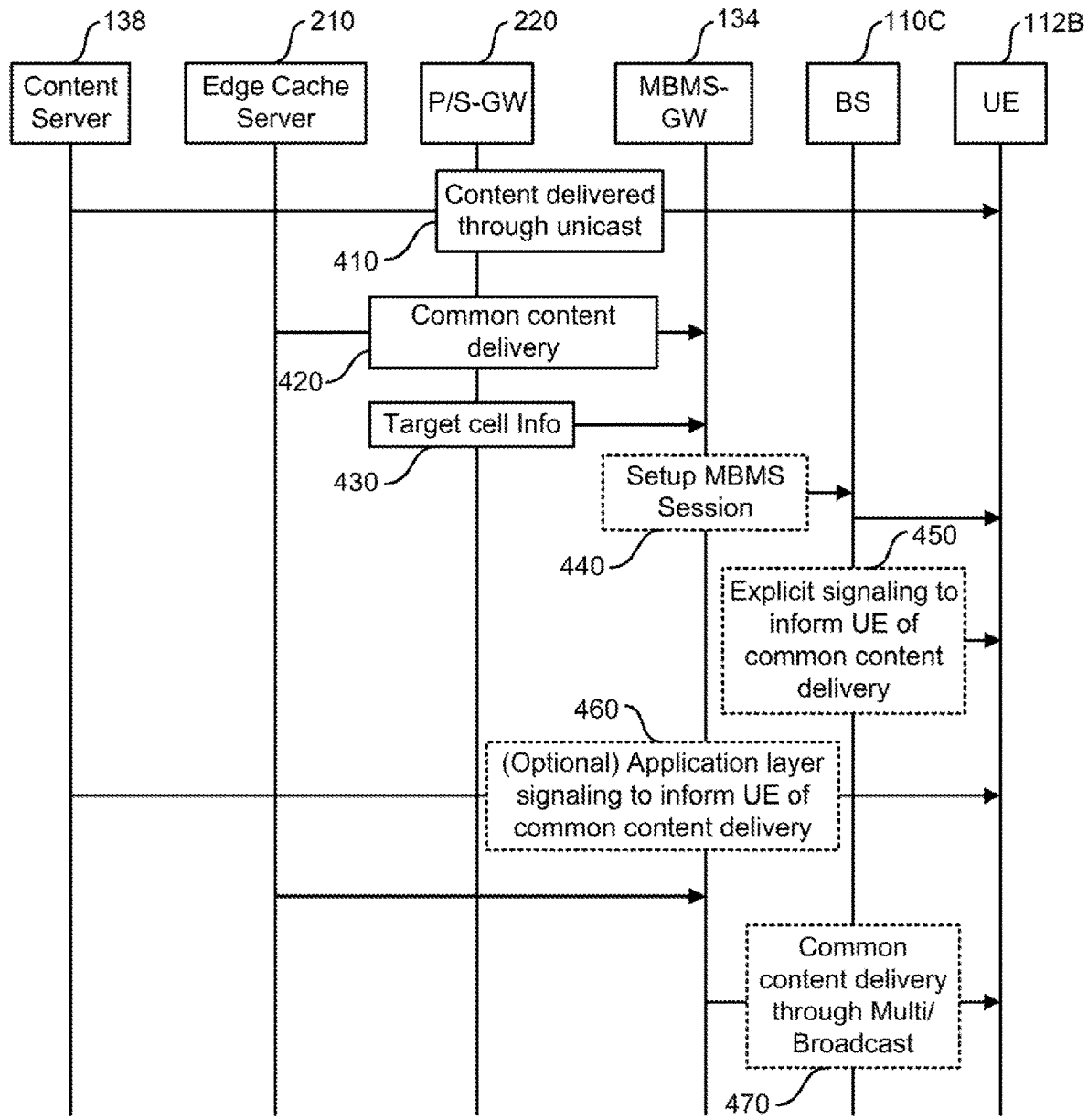
FIG. 4 depicts a signaling diagram associated with the edge cache server, in accordance with some example embodiments.

FIG. 4 depicts an example of a signaling diagram including an edge cache server, in accordance with some example embodiments.

When the UE(s) receive the common content through the multicast, broadcast, the UE may detect that the common content is meant for the same application that has unicast service flows as well. Nonetheless, the user-plane gateways (P/S-GWs 220/230) involved in the unicast transmissions may assist the MBMS gateway 134 and BMSC 136 to deliver the common content to the appropriate cells, where the UEs have requested, or are being provided with, the common content.

At 410, at least one UE (if not a group of UEs) may each receive a unicast service flow, in accordance with some example embodiments. As noted above, some of the UEs 112A-F may be receiving different flows from content provider server(s) 138. For example, the UEs 112A-F may be watching different movie or television content (although other types of content including emergency content may be provided by the content providers), and the content may be provided via gateways 220 (and/or 250).

At 420, the edge cache server 210 may provide common content to a MBMS gateway 134, in accordance with some example embodiments. The common content may be provided to the MBMS gateway 134 along with, at 430, information regarding the target cell(s) or base station(s), in accordance with some example embodiments. For example, the common content may be destined for some, if not all of, UEs 112A-F in the MBSFN coverage area 120 served by target base station 110A-C.

At 440, the MBMS gateway 134 may setup a MBMS session with at least one base station 110C covering at least one UE 112B, in accordance with some example embodiments. The MBMS session may be setup in the same or similar manner as described above at 330. For example, the MBMS point-to-multipoint control channel (MCCH) may be used as a control plane between the network and the UEs (which may be in RRC connected or idle mode), while the MBMS point-to-multipoint traffic channel (MTCH) may be used to carry user plane information between network and UEs. The MBMS point-to-multipoint scheduling channel (MSCH) may be used for transmission scheduling between the network and UEs.

At 450, the at least one base station 110C may signal the at least one UE 112B so that the at least one UE 112B is informed of the common content delivery, in accordance with some example embodiments. The UE may be informed in the same or similar manner as described above at 340. Alternatively or additionally, the at least one UE 112B may, at 460, informed of the common content delivery via application layer signaling between the content provider 138 and the at least one UE 112B (or an application therein), in accordance with some example embodiments. The UE may be informed in the same or similar manner as described above at 350.

At 470, the at least one base station 110C may deliver the common content via multicast, broadcast to the at least one UE 112B, in accordance with some example embodiments. The UE may be informed in the same or similar manner as described above at 360.

In some example embodiments, an interface 299 may be provided between the P/S-GW 220/230 and the MBMS-GW 134/BMSC 136 to enable the communication of the target cell information and the potential QoS information for the content delivery.

In some example embodiments, a multicast, broadcast bearer may be established (e.g., as a default or always) for certain applications and corresponding content providers. For example, a popular streaming video service may trigger a multicast, broadcast bearer to be established. In this example, the UE (and/or the application handling the popular streaming video service) may be informed of the established bearer and the possibility that there may be two streams or flows through which content may reach the UE (e.g., certain common content may be received as a service sub-flow via the multicast, broadcast, while other content may be received as a service flow via a unicast).

The packet gateway 220 may determine whether the packets are common, dedicated content and may perform forwarding to the multicast UE entities, such as MBMS gateway and BMSC 136, based on the source and destination IP address information and/or based on analyzing the traffic pattern (for example, based on the detection of multiple copies of the same information being sent to a multitude of users). Here, the packet gateway 220 may be located at any entity within the cellular network, which has the capability to enforce this method.

Figure 5:
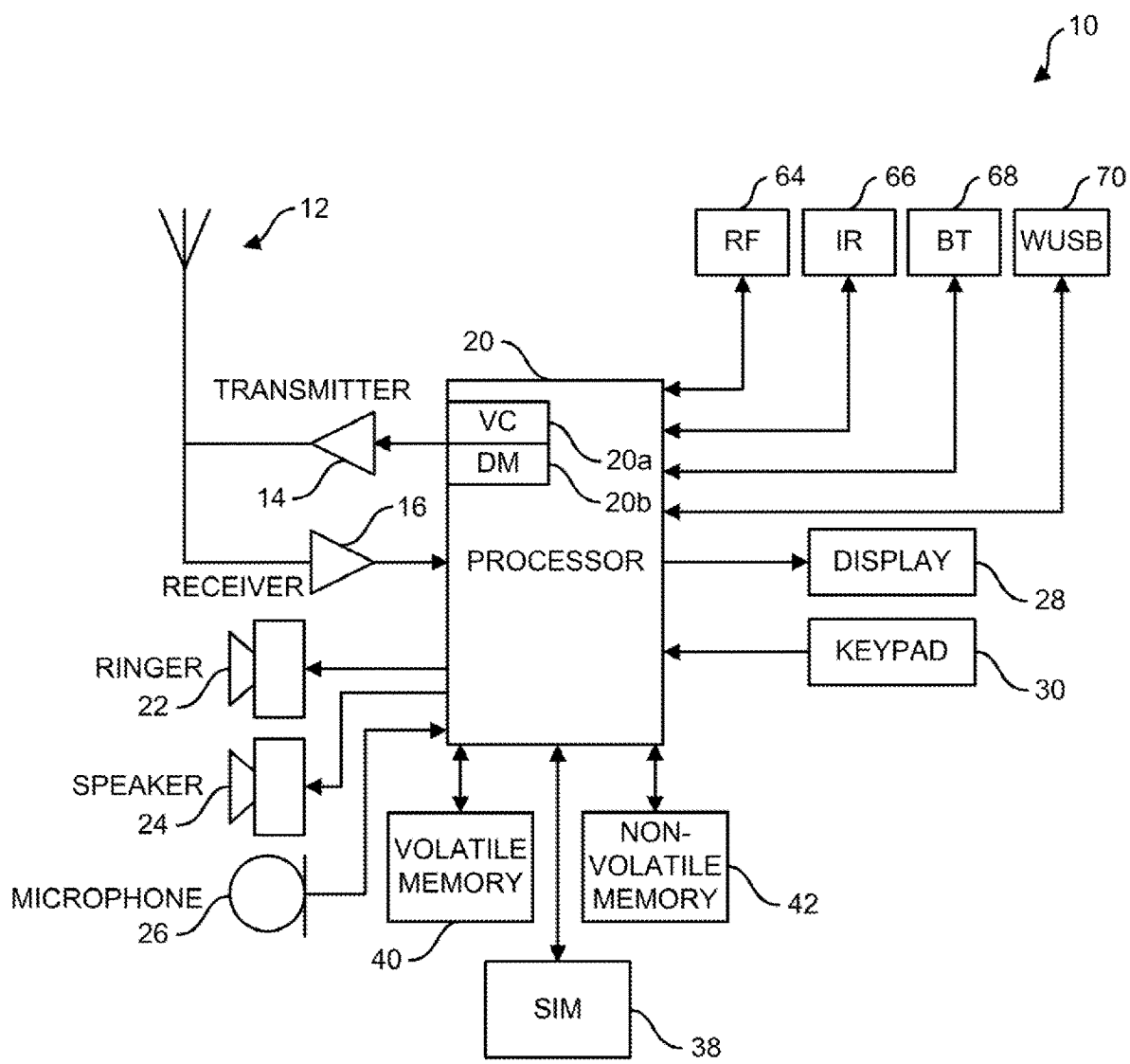
FIG. 5 depicts an example of a radio, in accordance with some example embodiments.

FIG. 5 illustrates a block diagram of an apparatus 10, in accordance with some example embodiments. The apparatus 10 may be implemented at a UE, such as a smartphone cell phone, tablet, IoT device, and/or other processing device.

The apparatus may also provide aspects of the base station, while the processor and memory including program code (alone or with other components of apparatus 10) may be configured to provide the edge caching server.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 10 may include a location processor and/or an interface to obtain location information, such as positioning and/or navigation information. Accordingly, although illustrated in FIG. 5 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

As shown in FIG. 5, apparatus 10 may also include one or more mechanisms for sharing and/or obtaining data. Moreover, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example within 10 meters. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory, and/or the like. Like volatile memory 40, non-volatile memory 42 may include a cache area for temporary storage of data. At least part of the volatile and/or non-volatile memory may be embedded in processor 20. The memories may store one or more software programs (for example, an application and/or user interface associated with personal communications via local vehicle-to-vehicle links), instructions, pieces of information, data, and/or the like which may be used by the apparatus for performing functions of the user equipment/mobile terminal. The memories may comprise an identifier, such as for example an international mobile equipment identification (IMEI) code, capable of uniquely identifying apparatus 10. The functions may include one or more of the operations disclosed herein, such as for example the functions disclosed at processes 300, 400, and/or the like. The memories may comprise an identifier, such as for example, an international mobile equipment identification (IMEI) code, capable of uniquely identifying apparatus 10. In the example embodiment, the processor 20 may be configured using computer code stored at memory 40 and/or 42 to provide processes 300, 400, and/or the like as disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example a computer or data processor circuitry. A computer-readable medium may comprise a non-transitory computer-readable storage medium that may be any media that can contain or store the instructions for use by or in connection with an instruction execution system, apparatus, or device, such as for example a computer. Furthermore, some of the embodiments disclosed herein include computer programs configured to cause operations as disclosed herein (see, for example, processes 300, 400, and/or the like).

Without in any way limiting the scope, interpretation, or application of the claims appearing below, a technical effect of one or more of the example embodiments disclosed herein is a reduction in radio resource utilization for delivering common content with the radio access network.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed is:

1. An apparatus comprising:
   at least one processor; and
   at least one memory including computer program code,
   the at least one memory and the computer program code configured to, with the at least one processor, cause the apparatus to at least:
     detect whether content is common content to be provided, via a multicast, broadcast transmission, to at least one user equipment;
     forward the common content to a multicast, broadcast gateway to enable delivery to the at least one user equipment via the multicast, broadcast transmission; and
     forward, as a unicast service flow, other content to the at least one user equipment to enable the at least one user equipment to selectively combine the unicast service flow with the common content carried by the multicast, broadcast transmission, wherein the at least one user equipment is enabled to switch, based on an indication, between the multicast, broadcast transmission and a unicast transmission carrying the unicast service flow, and wherein a subservice flow carries the common content via the multicast, broadcast transmission.

2. The apparatus of claim 1, wherein the common content is cached at an edge caching server in a mobile wireless network.

3. The apparatus of claim 1, wherein the common content forwarded to the multicast, broadcast gateway further includes information regarding one or more cells to which to transmit the common content via the multicast, broadcast transmission.

4. The apparatus of claim 1, wherein the forwarded common content is delivered through a dynamic network slice.

5. The apparatus of claim 1, wherein the common content comprises content common to a plurality of user equipment within an area covered by the multicast, broadcast transmission.

6. The apparatus of claim 1, wherein the common content includes content frequently downloaded by a plurality of user equipment within an area covered by the multicast, broadcast transmission.

7. The apparatus of claim 1, wherein the detection of whether content is common content is based on another indication representative of common content and/or an inspection of one or more packets.

8. The apparatus of claim 7, wherein the other indication representative of common content is applied by a content provider to indicate that the content is common content.

9. The apparatus of claim 1, wherein the detection of whether content is common content is based on how frequently content is fetched from an edge caching server by a plurality of user equipment in an area.

10. A method comprising:
    detecting whether content is common content to be provided, via a multicast, broadcast transmission, to at least one user equipment;
    forwarding the common content to a multicast, broadcast gateway to enable delivery to the at least one user equipment via the multicast, broadcast transmission; and
    forwarding, as a unicast service flow, other content to the at least one user equipment to enable the at least one user equipment to selectively combine the unicast service flow with the common content carried by the multicast, broadcast transmission, wherein the at least one user equipment is enabled to switch, based on an indication, between the multicast, broadcast transmission and a unicast transmission carrying the unicast service flow, and wherein a subservice flow carries the common content via the multicast, broadcast transmission.

11. The method of claim 10, wherein the common content forwarded to the multicast, broadcast gateway further includes information regarding one or more cells to which to transmit the common content via the multicast, broadcast transmission.

12. The method of claim 10, wherein the forwarded common content delivered through a dynamic network slice.

13. The method of claim 10, wherein the common content comprises content common to a plurality of user equipment within an area covered by the multicast, broadcast transmission.

14. The method of claim 10, wherein the common content includes content frequently downloaded by a plurality of user equipment within an area covered by the multicast, broadcast transmission.

15. The method of claim 10, wherein the detection of whether content is common content is based on another indication representative of common content and/or an inspection of one or more packets.

16. An apparatus comprising:
    at least one processor; and
    at least one memory including computer program code,
    the at least one memory and the computer program code configured to, with the at least one processor, cause the apparatus to at least:
        receive, via a unicast transmission, content received from a content provider via a serving gateway, wherein a unicast service flow carries the content via the unicast transmission;
        receive an indication regarding common content to be received via a multicast, broadcast transmission, wherein the apparatus is enabled to switch, based on the indication, between the unicast transmission and the multicast, broadcast transmission, and wherein a subservice flow carries the common content via the multicast, broadcast transmission; and
        combine the content received via the unicast transmission and the common content received via the multicast, broadcast transmission.

17. The apparatus of claim 16, wherein the indication is provided as signaling from a base station and/or provided via an application at the apparatus.

18. The apparatus of claim 16, wherein the apparatus is further caused to at least:
    receive the common content, wherein the common content is received, via the multicast, broadcast transmission, from at least one base station, a multicast, broadcast gateway, and an edge caching server in a mobile wireless network.

19. The apparatus of claim 16, wherein the common content comprises content common to a plurality of user equipment within an area covered by the multicast, broadcast transmission.

* * * * *